Feb. 22, 1938. O. F. SMETANA 2,109,156
STOCKING AND METHOD OF MAKING THE SAME
Filed March 21, 1936 6 Sheets-Sheet 1
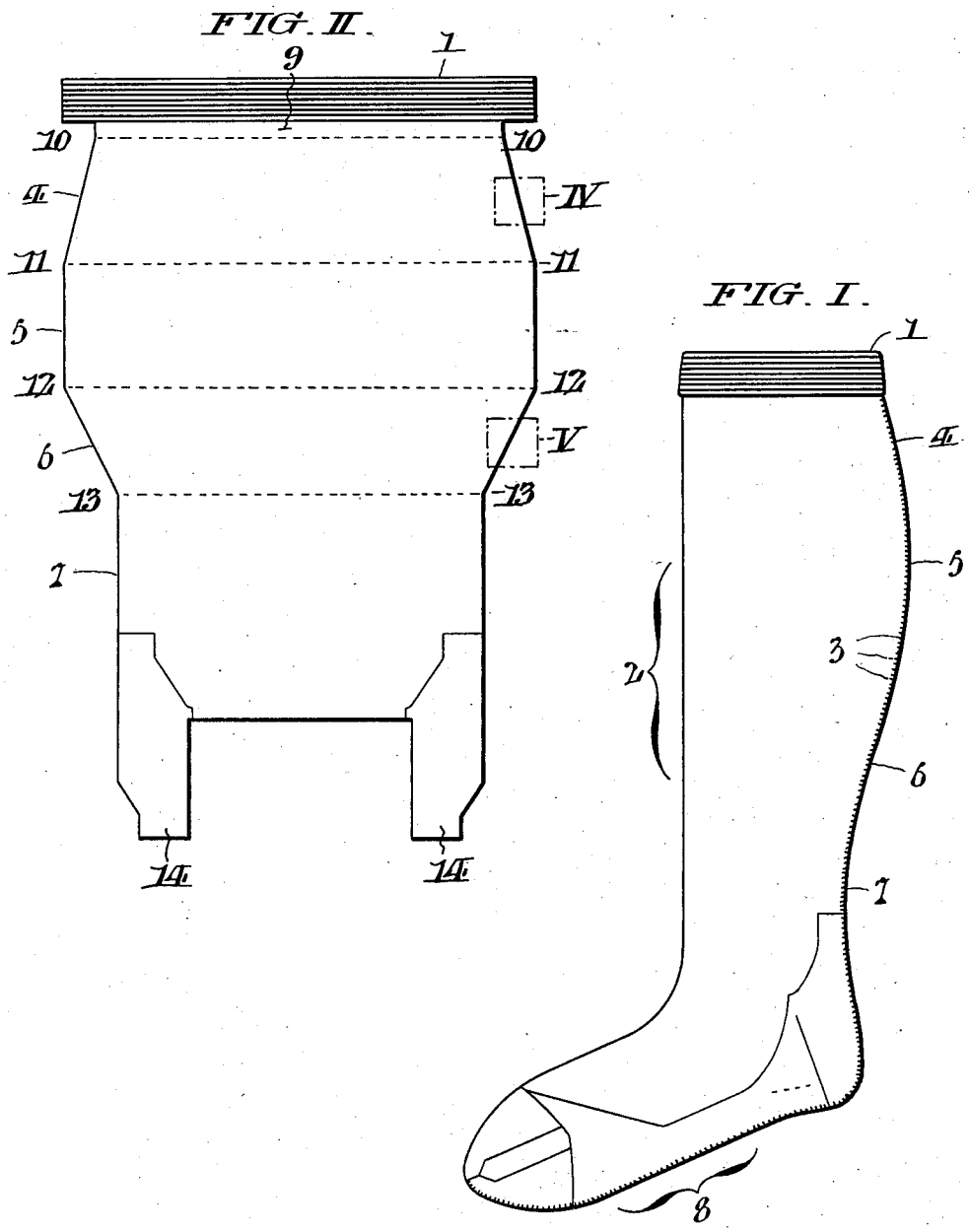
WITNESSES:
John E. Bergner
John A. Weidler
INVENTOR:
Otto F. Smetana,
BY Fraley Paul
ATTORNEYS.

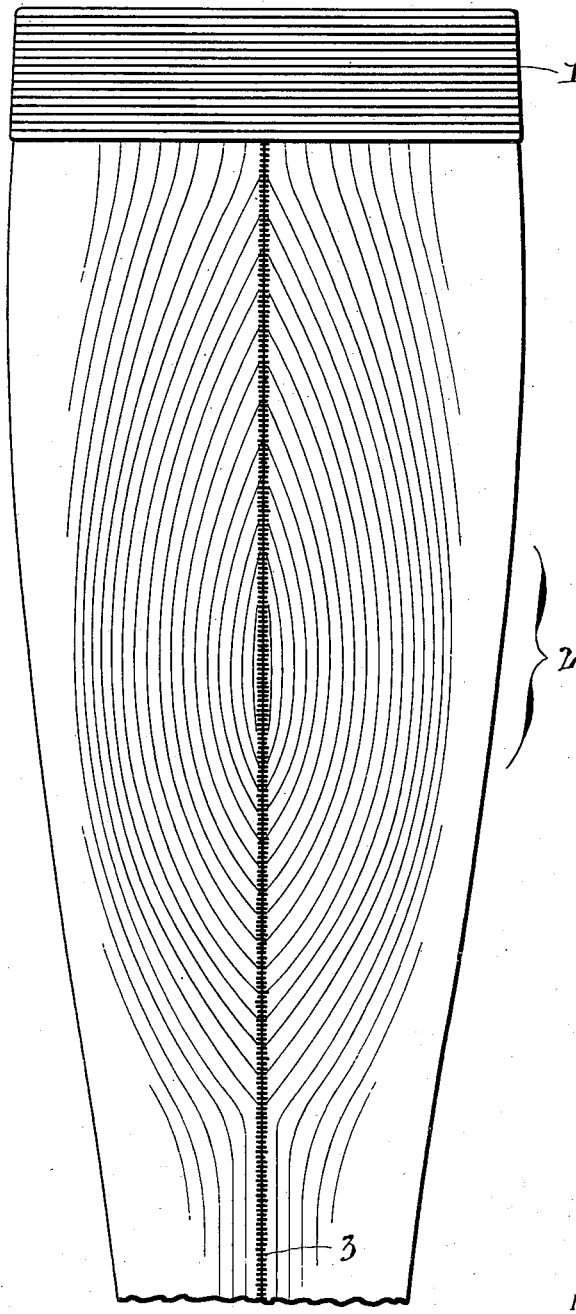

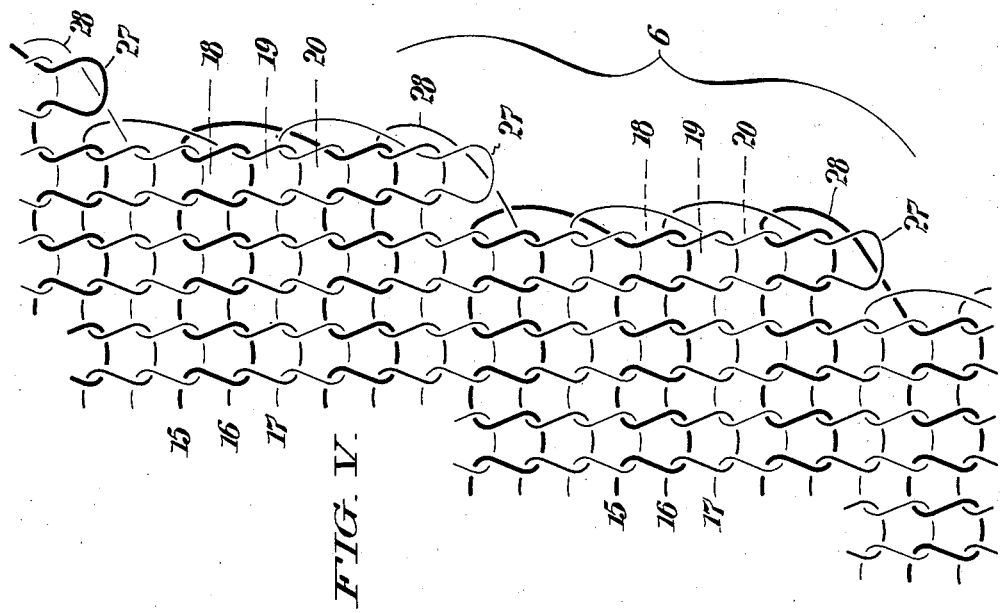
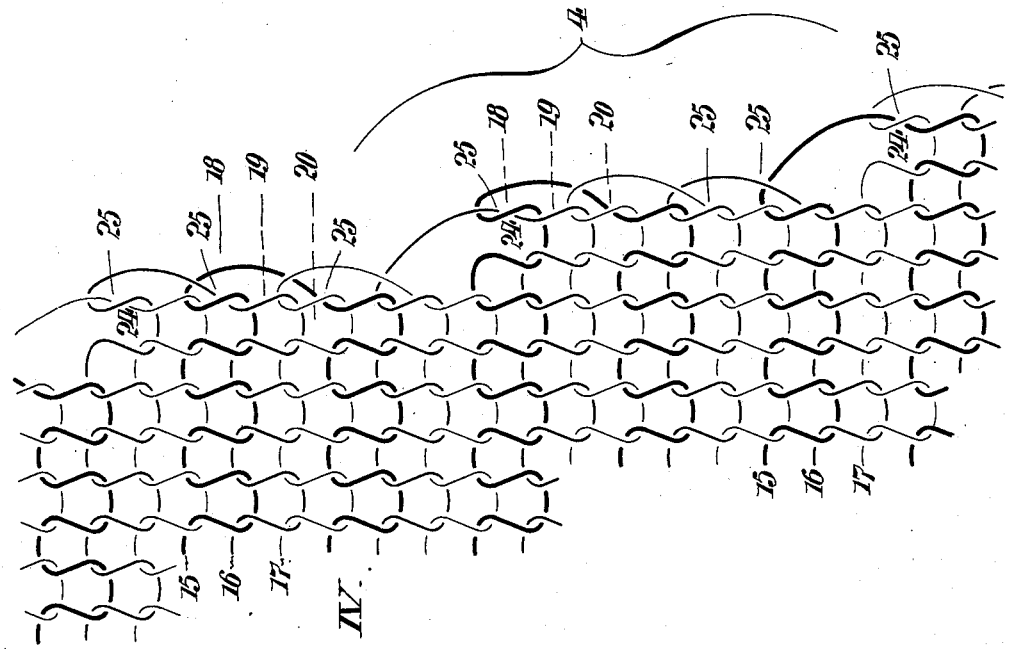

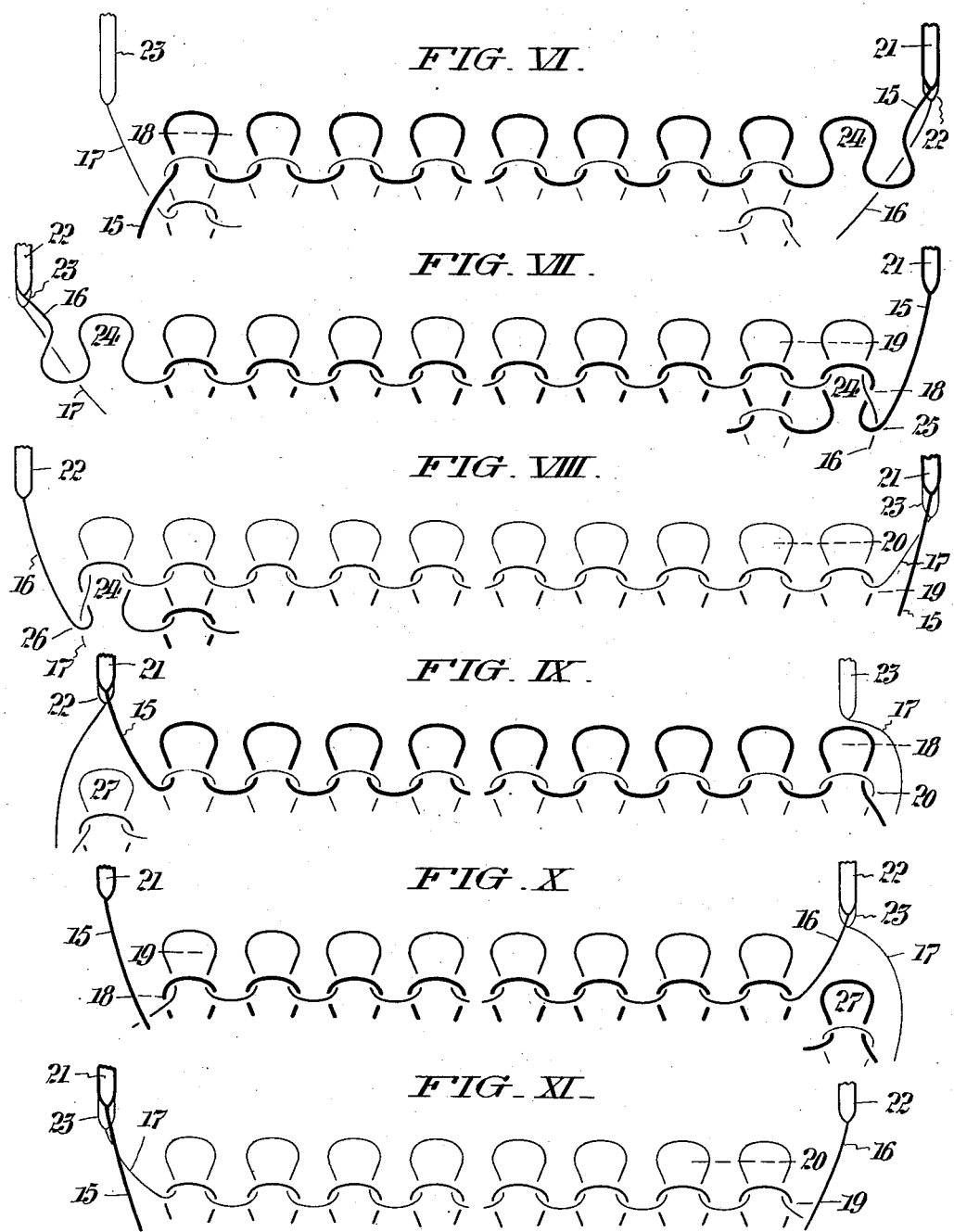

Feb. 22, 1938. O. F. SMETANA 2,109,156
STOCKING AND METHOD OF MAKING THE SAME
Filed March 21, 1936 6 Sheets-Sheet 5
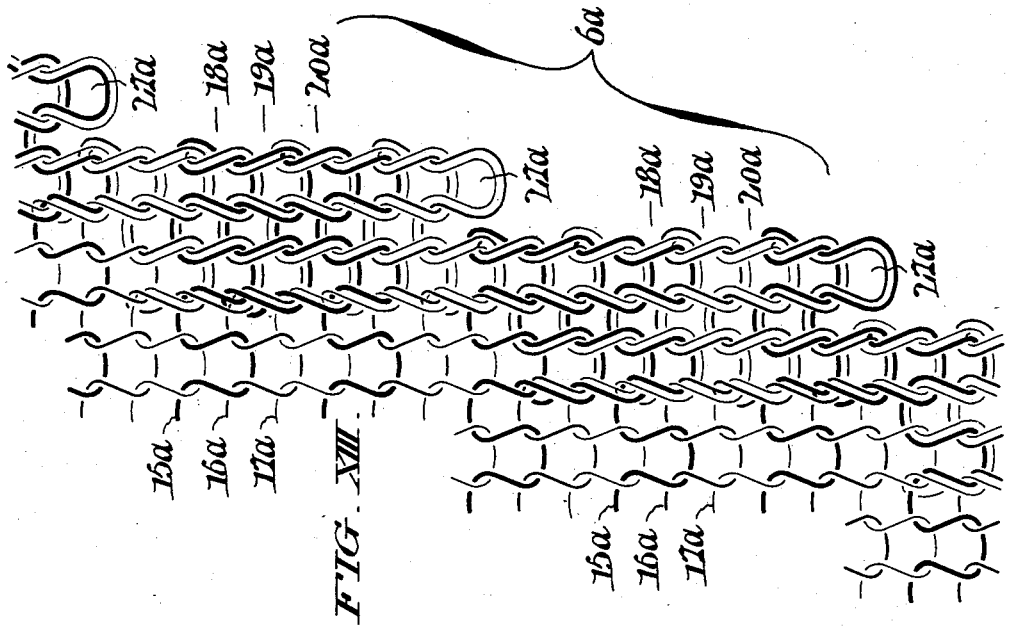
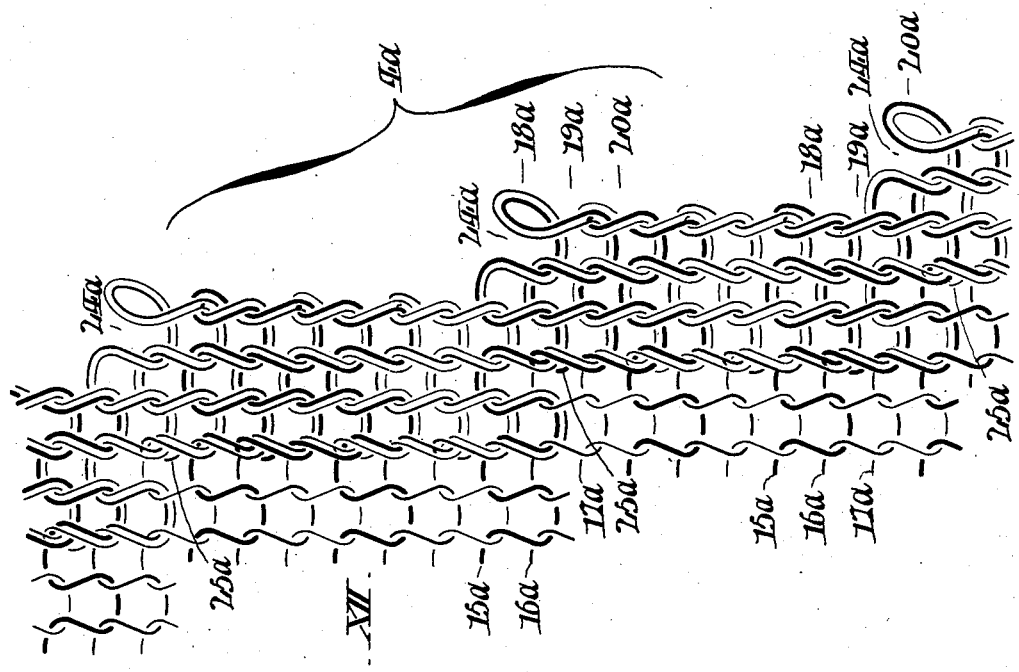
WITNESSES:
John E. Bergner
John A. Weidler
INVENTOR:
Otto F. Smetana,
BY Fraley Paul
ATTORNEYS.

Feb. 22, 1938.   O. F. SMETANA   2,109,156
STOCKING AND METHOD OF MAKING THE SAME
Filed March 21, 1936   6 Sheets-Sheet 6
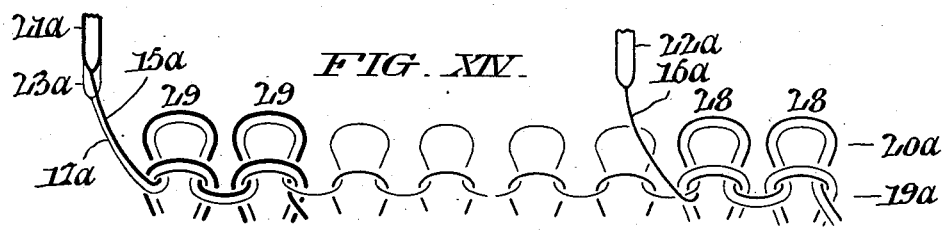
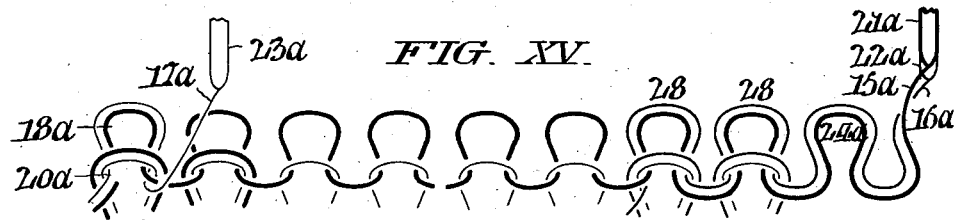
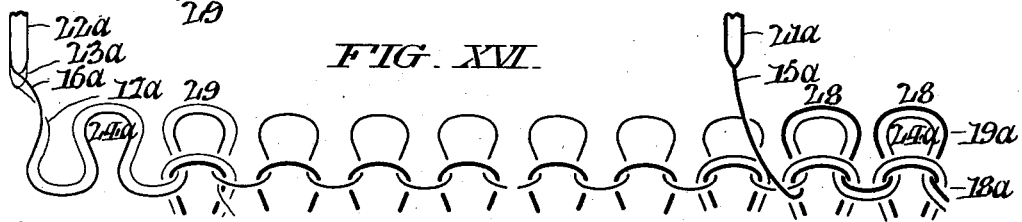
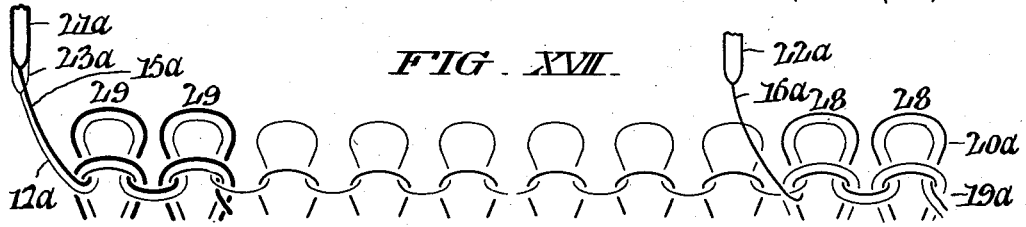
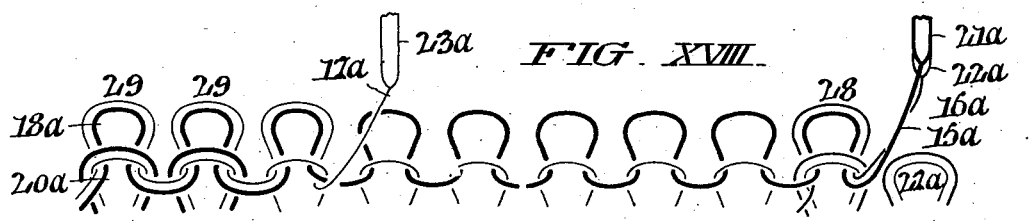
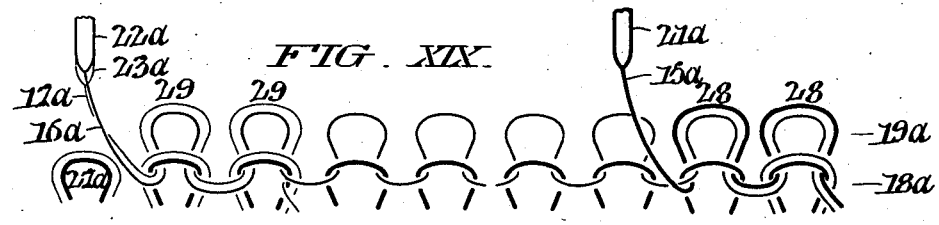
WITNESSES:
John C. Bergner
John A. Weidler
INVENTOR:
Otto F. Smetana,
BY Frally Paul
ATTORNEYS.

Patented Feb. 22, 1938

2,109,156

UNITED STATES PATENT OFFICE 2,109,156

STOCKING AND METHOD OF MAKING THE SAME

Otto F. Smetana, Philadelphia, Pa., assignor to Quaker Hosiery Company, Philadelphia, Pa., a corporation of Pennsylvania Application March 21, 1936, Serial No. 70,027

8 Claims. (Cl. 66—178)

This invention relates to full fashioned stockings, and it is concerned more especially with full fashioned stockings having elastic garter tops.

The knitting of the flat blank for the usual form of full fashioned stocking is started upon a maximum number of needles, and as the knitting proceeds, the web is gradually reduced in width in the region of the knee by periodic inward transfer of groups of end loops, and again in the lower calf region, with incidental formation of the characteristic fashioning marks at the shaped portions. Since a stocking produced in this manner is just as wide or of the same girth at the top of its calf portion as it is at the calf proper, it does not accurately fit the calf of the wearer and therefore has the tendency to slip or ride down on the leg.

In the case of a conventional three-quarter length fashioned garter top stocking on the other hand, the garter material must, of necessity, be considerably stretched incident to its application to the leg blank in order to compensate for the excess width of the blank at the top. Thus, when such a stocking is worn, the excess fabric gathers at the back of the knee joint immediately below the garter and presents an unsightly appearance.

The chief aim of my invention is to overcome the above drawbacks in connection with both full length stockings and three quarter length garter top stockings. This desideratum I attain as hereinafter more fully explained, by forming either type stocking from a blank having a shaped upper calf portion which progressively widens into the calf proper, as well as a shaped lower calf portion which tapers into the ankle so that the stocking accurately fits the leg of the wearer and holds itself in place thereon.

A further object of my invention is to secure the above advantages in a fashioned stocking which is devoid of fashioning marks in the calf, and which is produced as a "ringless" structure by employment of a plurality of yarns of the same kind and count in a predetermined repeating sequence in knitting successive courses of the fabric.

Other objects and attendant advantages will appear from the following detailed description of the attached drawings, wherein Fig. I shows a full fashioned three quarter length garter top stocking conveniently embodying the present improvements.

Fig. II shows the leg blank for the stocking featured in Fig. I.

Fig. III is a view on a larger scale showing the back of the stocking as it appears on the leg of the wearer.

Fig. IV is a diagrammatic view showing the texture along one edge of the widened portion of the stocking leg blank within the confines of the dot and dash rectangle IV in Fig. II.

Fig. V is a view showing the texture of the fabric along one edge of the narrowed portion of the stocking leg within the confines of the dot and dash rectangle V in Fig. II.

Figs. VI–VIII show successive steps in the knitting of the widened portion of the blank.

Figs. IX–XI show corresponding steps in the knitting of the narrowed portion of the leg blank; and Figs. XII–XIX are views like Figs. VI–XI showing a modification of my invention.

The stocking shown in Fig. I for convenience of illustration herein is of the three-quarter length variety with an attached elastic garter band 1 at the top of its leg portion 2, the stocking being seamed up the back as at 3 as is common with full fashioned hosiery. The upper part of the leg portion 2 widens as at 4 into the calf 5, while the lower part of the leg portion narrows at 6 from the calf into the ankle 7. It is to be especially noted from Figs. I and III that the leg portion 2 of the stocking is devoid of the usual fashioning marks which are characteristic of ordinary full fashioned stockings, its foot portion 8 being however in this instance of the usual full fashioned construction.

In producing the leg blank of Fig. II for my improved stocking on a flat knitting machine, a relatively narrow garter-attaching portion 9 of uniform width is formed down to the line 10—10; then the widened upper calf portion 4 down to the line 11—11; then the middle calf section 5 of a uniform width down to the line 12—12; then the narrowed calf section 6 down to the line 13—13; and finally the ankle portion 7 of uniform width with heel tabs or extensions 14. The top portion 9 of the blank is preferably knitted from a relatively heavy single yarn for capacity to better withstand the strains induced by stretching of the garter band 1, which latter may be either sewed to the blank after it is taken from the knitting machine, or impaled upon the needles of the machine and the blank knitted to it. In either case, the garter material is applied in a substantially slack condition to forestall any wrinkling or other deformation of the blank along the line of juncture. After the line 10—10 is reached, ringless knitting is preferably resorted to in forming the remaining portion of the blank with employment of a plurality of yarns of the same material and count in a predetermined repeating sequence for successive courses of the fabric, although if desired the remaining portion of the blank may be knitted from a single yarn of fingergauge.

Figs. IV and V exemplify an instance where three yarns are used, these being represented, for convenience of distinction, by lines of different thicknesses which are designated by the numerals 15, 16, 17, and the fabric courses respectively formed from them by the numerals 18, 19, 20. In accordance with my invention, the widened and narrowed portions 4 and 6 of the stocking blank are formed without the aid of the narrowing combs of the knitting machine, simply by periodically increasing and decreasing the traverse of the carriers which feed the respective yarns 15, 16, 17, and which are indicated at 21, 22, 23 in Figs. VI–XI, with attendant addition or dropping of one or more loops at each side of the fabric as at 24 and 25 in the illustrations last referred to and also in Figs. IV and V. The frequency with which the loops are added or dropped may be varied in practice depending on the degree of taper desired in the portions 4 and 6 of the blank. In the illustrated instance, the changes in the widening and narrowing occur at every eighth course. Figs. VI, VII and VIII show how one of the widening steps is effected. In Fig. VI, a fabric course 18 has just been knitted from the yarn 15 after traverse of the carrier 21 from left to right, the travel of said carrier having been increased slightly to the right with attendant formation of an additional end loop 24. In Fig. VII, a fabric course 19 has just been knitted from the yarn 16 after movement of the carrier 22 from right to left with attendant increase in the travel of said carrier and consequent formation of an additional end loop 24 at the left side. In this movement of the carrier 22 to the left, the float of the thread 16 is twisted as at 25 with the end or float of the yarn 15 extending from the idle carrier 21 whereby the newly added loop 24 at the right of Fig. VII is anchored against ravelling. In Fig. VIII, a course 20 of the fabric has just been knitted from the yarn 17 after traverse of the carrier 23 from left to right with attendant anchorage of the added loop 24 at the left hand side of the figure by intertwisting at 26 of the float of the thread 17 with the float of the thread 16 extending from the idler carrier 22. Thus from the above procedure, perfect selvages are formed along the edges of the widened portion 4 of the blank as instanced in Fig. IV.

Figs. IX–XI show how one of the narrowing steps in the portion 6 of the stocking blanks is effected. In Fig. IX, a course 18 has just been knitted from the yarn 15 after traverse of the carrier 21 from right to left with attendant decrease in the travel of said carrier and dropping of an end loop 27 in a previously formed course 20 at the left hand side of the web. In Fig. X a course 19 has just been knitted from the yarn 16 after traverse of the carrier 22 from the left to the right with attendant decrease in the travel of said carrier and dropping of the right hand end loop 27 of the previously formed course 18. In Fig. XI a course 20 has just been knitted from the yarn 17 after traverse of the carrier 23 from right to left. While the dropped loops 27 of the narrowed portion are left free, i. e. unanchored as shown in Fig. V, they are nevertheless safeguarded against easy ravelling by the binding action of the selvage loops at 28 and finally anchored when the edges of the blank are sewed or looped together.

Due to the fashioning of the blank after the manner described, the finished stocking of my invention accurately fits the leg since the girth at the garter is less than that at the middle of the calf with preclusion of the unsightly gathering at the back of the knee joint usual to garter top stockings shaped as ordinarily. A further advantage resulting from the hereinbefore described method of fashioning is that when the stocking is worn, the wales of the fabric arrange themselves in complemental curves at the back of the leg as conventionally shown in Fig. III and intersect in the seam 3. The effect thus produced is highly attractive and especially so by virtue of the absence of the usual fashioning marks in the leg.

Figs. XII and XIII show a modification in which the edges of the stocking blank are reinforced by the formation of double loops in each course of the knitting in the two endmost wales. This is effected in the widened portion of the blank after the manner shown in Figs. XIV–XIX. In Fig. XIV, a fabric course 20a has just been knitted from the yarn 17a after movement of the carrier 23a from right to left incident to which the carriers 22a and 21a each in turn followed part way so that their yarns 16a and 15a were interknitted respectively with the yarn 17a in the last two left and right hand end wales 28, 28 and 29, 29 of the fabric. In Fig. XV a course has just been knitted from the yarn 15a after traverse of the carrier 21a from left to right with attendant increase in the travel of the latter and formation of an added end loop 24a, incident to which the carriers 23a and 22a each in turn followed part way so that the yarn 17a was interknitted with the yarn 15a in the left hand end wale 29 and the yarn 16 interknitted with said yarn 15a in the two right hand end wales 28, 28 as well as in the newly added right hand end loop 24a. In Fig. XVI a course 19a has just been knitted from the yarn 16a after traverse of the carrier 22a from right to left with attendant increase in the travel of the latter and formation of an added end loop 24a at the left of the web, incident to which the carriers 21a and 23a each followed in turn so that the yarn 15a was interknitted with the yarn 16a in the two right hand end wales 28, 28 and the yarn 17a interknitted with said yarn 16a in the left hand end wale 29 as well as in the newly added left hand end loop 24a. The above cycle is periodically repeated, as in the first described embodiment, throughout the knitting of the widened portion 4 of the stocking blank.

The widened portion of the modified web shown in Fig. XII results from periodic repetitions of the following cycle: In Fig. XVII a course 20a has just been knitted from the yarn 17a after traverse of the carrier 23a from right to left incident to which each of the carriers 22a and 21a in turn followed part way so that their yarns 16a and 15a were respectively interknited with the yarn 17a in the two right hand and the two left hand end wales 28, 28 and 29, 29. In Fig. XVIII, a course 18a has just been knitted from the yarn 15a after traverse of the carrier 21a from left to right with attendant decrease in the travel of said carrier and dropping of the right hand end loop 27a of the preceding course 20a, incident to which each of the carriers 23a and 22a followed part way in turn so that the yarn 17a was interknitted with the yarn 15a in the left hand end wales 29, and the yarn 16a with said yarn 15a in the right hand end wale 28. In Fig. XIX, a course 19a has just been knitted from the yarn 16a after traverse of the carrier 22a from right to left with attendant decrease in the travel of said carrier and dropping of the left hand end loop 27a of the previously knit course 18a. Incident to the leftward traverse of the carrier 22a, the carriers 21a and 23a each followed part way in turn so that the yarn 15a was interknit with the yarn 16a in the two right hand end wales 28, 28, and the yarn 17a with said yarn 16a in the two left hand end wales 29, 29. Structurally the fabric of Figs. XII and XIII is the same as the fabric of Figs. IV and V, except for the doubling of loops of the end wales 28 and 29, and the inward displacement of the anchorages 25a, in Fig. XII. Although in Figs. XII and XIII the added and dropped loops 24a and 27a are free, they are effectively held in place and prevented from ravelling as a consequence of the interknitting of two yarns in the terminal wales along opposite side edges of the web, until finally anchored when edges of the blank are subsequently seamed together.

As other alternatives, the portion of the blank for my improved stocking below the line 10—10 in Fig. II may be formed from a single main yarn, instead of the three shown in Figs. IV, V and XII, XIII, and two other yarns interknitted with it in one or more of the terminal edge wales of the fabric, with resultant effective binding in of free added and dropped end loops in the same manner as explained in connection with Figs. XII and XIII.

Any suitable mechanism may be utilized in the knitting machine to control the operation of the various yarn carriers for the purposes of my invention as hereinbefore set forth, and as defined in the appended claims.

While I have herein shown and particularly described my invention as embodied in a three quarter length garter top stocking, it will be evident to those skilled in the knitting arts that advantages equal in all respects to those hereinbefore pointed out are attained in full length stockings fashioned in accordance with the disclosed method.

Having thus described my invention, I claim:

1. As a new article of manufacture, a stocking formed from a flat fashioned blank devoid of fashioning marks, whereof successive fabric courses are knit by alternative use of a multiplicity of yarns of the same kind and count in a definite repeating sequence, the widening being accomplished by addition of end loops and the narrowing by dropping of end loops.

2. As a new article of manufacture, a three-quarter length fashioned stocking having a leg portion devoid of fashioning marks, whereof successive fabric courses are knit by alternative use of at least three yarns of the same kind and count in a definite repeating sequence, the upper part of said leg being shaped by widening, and its lower part being shaped by narrowing; and having a top garter band of a girth substantially equal to that of the top edge of the stocking proper.

3. The method of producing a flat fashioned blank for a stocking which comprises alternative use of at least three yarns of the same kind and count in a predetermined repeating sequence to knit successive fabric courses; and widening the fabric to shape the upper calf portion by periodically adding end loops with incidental formation of selvages wherein the added loops of each widened course knit with one yarn are anchored by intertwisting with floats of another of the yarns.

4. The method of producing a flat fashioned blank for a stocking which comprises alternative use of at least three yarns of the same kind and count in a predetermined repeating sequence to knit successive fabric courses; widening the fabric to shape the upper calf by periodically adding end loops with incidental formation of selvages wherein the added loops of each widened course are anchored by intertwisting with floats of another of the yarns; and narrowing the fabric to shape the lower calf portion by periodically dropping end loops.

5. As a new article of manufacture, a stocking formed from a flat knit fashioned blank with a widened and narrowed calf portion devoid of fashioning marks, wherein alternate courses are formed in a definite repeating sequence from a plurality of yarns of the same kind and count, and wherein added end loops in widened courses knit from one of said yarns are interengaged with, and anchored by skip floats of others of the yarns at the fabric edges.

6. The method of producing a fashioned blank for a stocking or the like, which comprises alternative use of a multiplicity of yarns of the same kind and count in a predetermined repeating sequence to knit successive individual courses; widening the fabric to shape the blank by periodically adding end loops at opposite edges of the fabric; and forming the added end loops, in each course where they occur, double from the yarn used to knit such course and the yarn used to knit a contiguous course.

7. The method of producing a fashioned blank for a stocking or the like which comprises alternative use of a multiplicity of yarns of the same kind and count in a predetermined repeating sequence to knit successive individual courses; narrowing the fabric by periodically dropping end loops at opposite side edges of the fabric; and forming the dropped end loops in each course where they occur, double from the yarn used to knit such course and the yarn used to knit a contiguous course.

8. As a new article of manufacture, a stocking formed from a flat knit fashioned blank with a widened and narrowed calf portion devoid of fashioning marks, wherein alternate fabric courses are formed in a definite repeating sequence from a plurality of yarns of the same kind and count with added end loops in the widened courses and with dropped end loops in the narrowing courses, and wherein said added and dropped loops at each side of the fabric in the respective courses where they occur, are formed double from the yarn used to knit such courses and from the yarn used to knit a contiguous course.

OTTO F. SMETANA.